Aug. 15, 1967     D. W. COLE     3,335,488
MATERIAL JOINING BY SOLID STATE COHESION
Filed Sept. 20, 1963     6 Sheets-Sheet 1

INVENTOR.
DONALD W. COLE

BY *Charles Woodward*

ATTORNEY

DONALD W. COLE
INVENTOR

DONALD W. COLE
INVENTOR

DONALD W. COLE
INVENTOR

United States Patent Office 3,335,488
Patented Aug. 15, 1967

3,335,488
MATERIAL JOINING BY SOLID STATE COHESION
Donald W. Cole, Weatherford, Tex., assignor to General Dynamics Corporation, San Diego, Calif., a corporation of Delaware
Filed Sept. 20, 1963, Ser. No. 310,400
1 Claim. (Cl. 29—470)

The present invention relates generally to metal joining and the novel employment of a newly discovered physical phenomenon therefor. More particularly, the invention relates to the novel employment of a phenomenon which engenders solid state cohesion of two or more materials, and to the utilization of such solid state cohesion processes for effecting a structural vinculum in materials of similar or dissimilar composition and/or compatible or incompatible structural characteristics. This is accomplished by subjecting such materials to high velocity impulses derived from an energy release source, as exemplified by explosives, thereby rearranging atomic linkages in or near the inner faces or faying surfaces of the object materials. This effects an atomic or molecular cohesion or adhesion of the workpieces and the formation of a substantially continuous, integrated mass.

At any given temperature above absolute zero, all solids have varying degrees of internal movement, generally referred to as molecular motion. This movement is symmetrical throughout the solid except at the surfaces, wherein exists a condition somewhat akin to surface tension in a liquid. Simply stated, a solid may be considered as a mass consisting of a plurality of microscopic cohesive spheres, with the exception of its surfaces. These would consist of hemispheres. Except at the surface, the molecular structure is balanced and substantially uniform. At the surface, this structure is unstable and nonuniform.

When two such surfaces are brought into perfect contact under ideal conditions hereinafter specified, the hemispheres in the first solid, complete or balance themselves structurally by uniting with the hemispheres of the second solid, thus forming an integrated whole, i.e., the interface disappears and the two separate solids become one integral mass. This is essentially what occurs when a weld is created at any temperature above absolute zero. However, energy must be applied in some form to effect such a union. This energy generally is in the form of high temperature, which temperature melts and intermixes the substance of one solid with that of the other. However, with the development of high pressure technology, it has been discovered that extreme pressures also produce this union. Therefore all known welding processes fall within these two extremes in a progression which follows a general rule, viz, the less temperature applied, the more pressure necessary, and vice versa.

The requirement for structural materials having a high strength-to-weight ratio is becoming ever more critical with the advent of aeronautic and space technology. Heat treatable aluminum alloys and the refractory metals are among those materials which can be considered in this category. These metals are difficult to weld by conventional fusion welding processes, and generally when subjected to these processes they experience a serious degradation in mechanical properties. That is, the properties of the original base material cannot always be regained, since eutectic and grain boundary melting in the heat affected areas and tempering processes used thereon produce a zone of weakness immediately adjacent the weld-base metal interface. This obviously sets the stage for failures to subsequently occur.

Teachings of the prior art relating to explosive welding of similar and dissimilar metals, as exemplified for example by United States Patent Number 3,024,526, and other published art, describe processes which are primarily dependent upon a geometrical collision factor of the metal surfaces which impart a controlled shearing motion inducing plastic deformation at the interface of the workpiece. The result attained by such processes are referred to in the prior art as transverse waves or jetting. These transverse waves form a mechanical interlock by a keying attachment. In addition, such processes are dependent, in part, upon the super-heating of the gases within the gap between the metal interfaces, which super-heated gases produce local or rudimentary fusion welding.

After the application of the above described known processes, the interfaces are still plainly definable and the lack of structural integrity within the weld zone is apparent. Further, gases, oxides and organic impurities between faces are merely broken up and carried before the wave crests or jets until wave crest roll-over occurs, thereby depositing these collected impurities within the weld line. This severely limits the ability of the weld to attain its ultimate strength. Furthermore, the function of angle-of-incidence or the geometrical collision factor, and the spacing and placement of explosives are extremely critical; for, if these factors are not precisely predetermined and maintained, spalling will occur.

It is therefore the salient object of the present invention to effect a vinculum of two or more materials wherein little common evidence of separate boundaries or interfaces remain. This object is attained by providing regulated energy impulses in the proper time-energy relationships to effect interatomic or intermolecular bonding between the atoms near the surface of one solid and those atoms near the surface of an adjacent solid, resulting in a compatible continuation of the atomic configuration of one solid into the atomic configuration of an adjacent solid.

Another object of the present invention is to preclude the development of detrimental physical properties on joinder of the parent materials, which object is attained by regulating the time-energy relationship relative to the material being processed, with less regard to the thickness and contour than is necessary in conventional methods.

It is still another object of the invention to provide a process by which cohesion between metals can be accomplished in a predetermined and controllable pattern when partial attachment of two or more sheets is desired.

Other objects and many attendant advantages of this invention will become readily apparent from a consideration of the following description, drawings and appended claim. It should be noted that the terms and expressions employed herein are terms of description and not limitation. No intention of excluding any equivalents of features shown or described or portions thereof should be ascribed to the use of such terms and expressions. However, recognition is given to the fact that various modifications are possible within the scope of the invention claimed.

In the drawings:

FIGURE 11 is a photomicrograph of a titanium sheet and a low carbon steel sheet following union;

FIGURE 12 is similar to FIGURE 11 but shows the titanium and low carbon steel sheets after etching.

The present invention relies upon the molecular linking or completion of the unbalanced atomic surface structure of one material with the corresponding atomic structure of an adjoining material. In considering the atomic structure of a material, it is apparent that the atoms at and immediately beneath the surface of such material are not bonded as symmetrically as the atoms in the interior of the material. The interior atoms, in a sense, are bonded to adjacent atoms in all directions, while surface atoms obviously have no interatomic bonds which extend beyond the surface of the material. This results in a condensing and reorientation of the bonds of the atoms at a surface and, consequently, a disruption of uniform bonding. Such surface atoms, however, display a proclivity to symmetrical and equal bonding on all sides to satisfy this unbalanced condition.

To understand the application of this condition to solid state joining, a basic understanding of interface tension, that is, metal surface phenomena, is needed. Thus, briefly, the number of apparent bonds per atom in a molecule depends on the number of atoms and their configuration, that is, on the lattice structure of the molecule. Similarly, the apparent bonds per atom in a metal depend on the number of neighboring atoms as determined by the lattice structure. In the body centered cubic lattice (B.C.C.) the near neighbors of any single atom are eight, with six neighbors farther removed. In the face-centered cubic lattice (F.C.C.) the near neighbors are twelve. In these lattice structures, affinities of one atom for another are dependent on the relative proximity of the atoms, and at the areas contiguous between atoms electrons are shared and resonating bonds are formed.

The significance of this relationship with respect to metal surfaces is twofold. First, a metal surface constitutes a portion of the lattice, but surface atoms may have from only half to three quarters the usual number of neighbors. This means that the strength of each bond per surface atom must be appreciably greater than the average for the lattice. In addition, the attraction of surface atoms to their neighbors in the surface and to the second layer of atoms below the surface must be somewhat greater than applies to the inner atoms of the lattice in order to attain a balance. It follows that the characteristic atomic radius must thus be less than the radius ordinarily assigned from density or X-ray data.

The equilibrium radius of an atom on the surface with half the normal number of neighbors is in the order of 0.09 A. (Angstroms) less than the usually assigned value. Since there are natural restraints that prevent surface atoms from contracting as much as 3 to 7 percent, which would be required by such a change of radius, a compromise situation results in which the atoms in the body of the metal are under compression and the surface atoms are in tension. This, of course, gives rise to the familiar surface tension, well known in liquids, but less well known and more difficult to demonstrate in solid metals. There is no doubt, however, of the existence of surface tension in solid metals.

The second significant fact is that when any substance is in an environment wherein its atoms share electrons or form bonds with the other surface atoms, the bonds of the surface atoms for each other and for their underlying neighbors will weaken and, consequently, will tend to relieve some of the surface tension. The stronger the bond of this kind and the greater the number of interacting atoms, the greater will be the effect on surface properties.

Therefore the surface tension of a material can be considered, in a sense, as an energy barrier. This energy barrier prevents the union of materials. One well known illustrative example of reducing the surface tension is Johansson gauge blocks. The surfaces of these blocks are polished to an optical flat finish. In this condition the two blocks will adhere to each other due to atmospheric pressure, even though there is still a finite median layer of air existing between the two blocks at the interface.

If energy is applied in the proper time-energy relationship, the critical energy barrier or surface tension phenomenon may be overcome. This is due to the augmentation of the energy within the atomic structure, thus making possible completion or satisfaction of the unbalanced atomic structure. These conditions thus engender rearrangement of the atomic bonds across the surface structures of the two materials. The energy necessary to thus induce cohesion between materials will vary with the materials damping capacity, shock impedance, thermal conductivity and other properties which make up its unique physical characteristics.

In the practice of the present invention, the essential feature is an induction of high energy, in the proper energy-time relationship, into the atoms in or near the surface of a material. This facilitates readjustment of the interatomic or intermolecular bonds near the surface, since, when the energy level of the aforementioned atoms is raised to, or exceeds, the energy of the critical energy barrier, the formerly unbalanced or unsymmetrical linkages at the surface become better balanced by bonds being formed between atoms or molecules at the two surfaces. Thus, in the practice of the present invention, energy (for example, an explosive, through its shock wave) is caused to act directly on the molecular or submolecular structure to overcome the critical energy barrier and thus cause a rearrangement of the structures on the surfaces.

In a complete and perfect solid state bond, the unbalanced interatomic or intermolecular bonds are substantially balanced or satisfied as they are elsewhere within the interior of the parent materials. This perfect bonding can only occur between materials which are completely compatible with each other. The compatibility of two surfaces will be dependent upon factors such as purity, surface conditions, crystal orientation, the atomic size of the materials, electromotive characteristics and chemical similarities. As factors of compatibility are less perfectly matched, the perfect solid state bond is more difficult to attain.

Another essential feature is to minimize the loss or use of energy in extraneous actions or reactions and to maximize the efficient utilization of such energy in readjusting or establishing new bonds between materials. An example of the extraneous use of such energy is the superheating of gases which are entrapped within microscopic irregularities between the surfaces of the materials due to the rapidity with which an energy or shock wave is introduced and propagated throughout the material. This superheating results in local or general melting or in fusion welding as known and described by the cited related art. Therefore, a high energy-short time relationship is employed in the present invention in an efficient manner, thus allowing as much energy as possible to be utilized explicitly in establishing (i.e., rearranging) the bonds between materials without energy loss in superheating entrapped air, mass movement, or in causing unnecessary phase changes, eutectic melting or recrystallization. This is not to say, however, that high temperatures do not result from the extreme pressure effects attained herein, but in accordance with the present invention, these conditions are so controlled and minimized that substantially none of the above stated deleterious effects occur.

The time and energy relationships, in accordance with the herein described process, are controlled in part by the explosive materials and their characteristics, such as the type of explosive and its detonation rate. These relationships will, however, vary with the materials being processed according to the latter's shock impedance and other physical characteristics. Further, plane wave generators and other shock focusing devices may be employed as means for controlling the configuration of the shock introduced into the material and as means for controlling the timing of the propagation of the shock wave front. Further, controls can be effected by varying the thickness of the materials relative to the thickness of explosive, thereby increasing the high pressure-time interval between the passing of the shock front and the arrival of the rarefaction relief wave. Such an increase in the high pressure-time interval allows the molecular or atomic bonding to be fully completed prior to the occurrence of stresses induced by the rarefaction wave. A backup plate of similar or of identical shock impedance as that of the last or back sheet of material to be joined will avoid the problems presented by the reflection of the rarefaction relief wave.

The spectrum of materials which may be joined by the time and energy relationships that is possible within the scope of the process of the present invention comprises, but is not limited to, the heretofore difficult-to-join metals such as aluminum at one extremity and the refractory and exotic metals such as titanium, niobium, columbium and tantalum at the opposite extremity.

Figure 1:
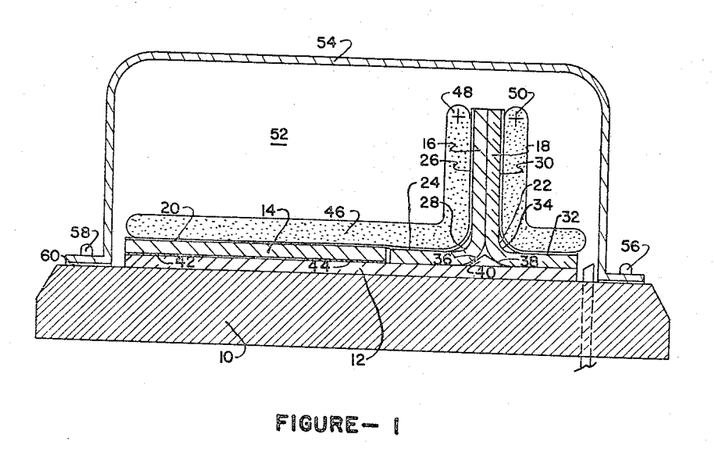
FIGURE 1 is an elevational view in cross-section of a typical means for practicing the invention with the masked areas exaggerated for purposes of clarity.

A typical means for performing the process of the present invention, preferably accomplished in a vacuum, is illustrated in FIGURE 1. The configuration of the means shown greatly reduces the possibility of superheating gases between the faying surfaces, which consequently results in a more efficient use of the induced energy. As shown, the forming means comprises a back-up plate 10 upon which are positioned blanks or elements 12, 14, 16 and 18 to be joined. Back-up plate 10 is preferably of the same shock impedance as the element 12 in order to reduce the reflection of the rarefaction or relief wave, as heretofore explained. The elements 12, 14, 16 and 18, which when properly positioned, must be in intimate and direct contact the elements being shown spaced in order to more clearly illustrate the mask 42, 44, but it should be understood that such showing is only for the purpose of illustration, are overlaid with a sheet 20 which may be paper, plastic or glass cloth. Such masking need be only thick enough to prevent contact of the facing surfaces, and where desirable, thicknesses of 0.0001 inch have been satisfactory. Obviously, the surfaces to be joined must be in contact as taught herein, so the masking is kept as thin as possible. Where desired, a suitable resilient modifier 22, which may be, for example, clay or the like, is positioned so as to prevent shearing occasioned by the collision of converging shock waves. Thus, for purposes of illustration, element 16 is shown as having outer facing surfaces 24 and 26 at right angles to one another forming an included angle 28 therebetween, while element 18 has outer facing surfaces 30 and 32 forming angle 34 therebetween. The resilient modifier 22 is positioned within the angles 28 and 34.

Conversely, elements 16 and 18 have corresponding inside angles 36 and 38 which have small radii, resulting in a "delta" void where the inside angles or radii are adjacent. In this instance, a fillet material 40 of triangular cross-sectional shape and similar or identical metallurgically to elements 16 and 18 may be positioned in this void to provide a fillet. Controlled interruption of the union may be obtained by employment of suitable masking agents 42 and 44 of paper, nonvolatile paint or the like shown, as noted above, greatly exaggerated for clarity of illustration.

A suitable explosive 46, such as blasting gelatin, PETN, RDX, pentolite or the like, is uniformly positioned over sheet 20 in intimate contact therewith together with modifier 22 and primed at the upper edges with suitable detonating caps schematically represented at 48 and 50. The placement of the detonating cap or caps varies with physical conditions and materials employed and processed. A filler 52 is placed upon explosive 46 to insure its positioning and achievement of maximum effect. Retort 54 of stainless steel or the like, covers the set-up and is positioned upon and sealed to back-up plate 10 by means of guide pins 56 and 58 and a suitable vacuum grease or gasket 60. Retort 54 is then evacuated to approximately 25 inches of mercury or better vacuum, consequently securing retort 54 to back-up plate 10 by means of the differential pressure developed, which renders the resulting chamber waterproof. It is then lowered into a water medium to a depth of 10 inches or more. This depth should be less than that known depth which yields the critical hydrostatic pressure for the explosives being employed. Explosive 46 is then detonated and in the specific form illustrated, results in the configuration shown in FIGURE 2.

Figure 2:
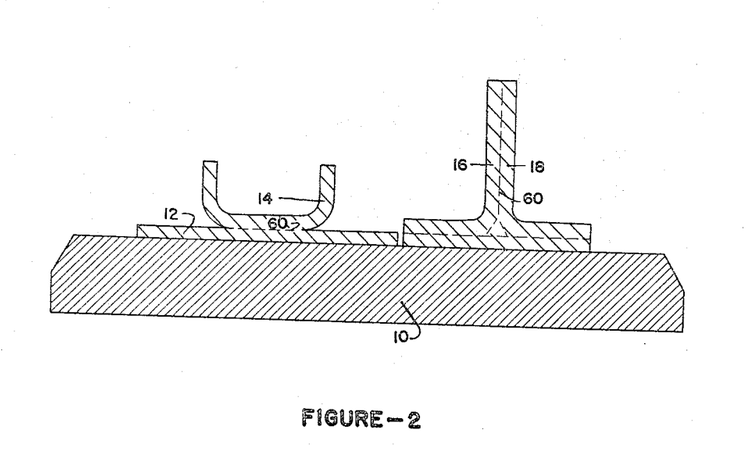
FIGURE 2 is a sectional, elevational view of the configuration resultant from the means of FIGURE 1.

FIGURE 2 is an elevational, cross-sectional representation of the materials joined as a result of the particular placement described above with reference to FIGURE 1, and is shown, for purposes of illustration, as still comprising the four major elements 12, 14, 16 and 18. However, as hereinafter set forth in detail, these plural elements, in effect, become one. This is illustrated by dashed line 62 which indicates their previously facing surfaces. It is, of course, understood that no line of demarcation or joinder exists with the herein described invention, as more clearly shown in subsequent figures. FIGURE 2 further illustrates member 14 with its end portions mechanically bent away from member 12. This condition illustrates the function of masking agents 42 and 44.

Many different means and variations of the above may be employed within the scope of the invention. One variation wherein a vacuum is not necessary is, in essence, identical to the hereinabove described process with the exception that retort 54 is not employed. In this instance, members 12, 14, 16 and 18, resilient modifier 22, sheet 20 and explosives 46 are enclosed within a suitable waterproof bag (not shown) and retained upon back-up plate 10 by a conventional restraining means, such as tape. Obviously, many modifications and variations will become apparent to those skilled in the art. In that the process does not depend on the "slapping together" of masses with its resultant plastic deformation and heat, which would, in fact, be detrimental, it is important that the surfaces to be joined are in direct contact, thus permitting the energy input to act on the molecular structure through the masses to cause reorientation thereof by overcoming the surface tension barrier. Thus, it is apparent that the shock wave energy is imparted directly to the material in an efficient manner, rather than on the material.

Examples are hereinafter set forth as illustrative of the several capabilities in regard to cohering previously substantially non-joinable metals by use of the process disclosed. These examples are for purposes of illustration only and are not to be construed as imposing limitations on the scope of the invention.

*Example 1 (see FIGURES 3 and 4)*

Material: One sheet of 7075–0 clad aluminum, stacked on 6 sheets of clad 2024–0 aluminum all sheets being rolled sheet in the "as rolled" condition Cleaning: Degreased with methyl ethyl ketone in a conventional manner Size: 6 inches x 6 inches x 0.032 of an inch Explosive: A ⅜ inch layer of 65% gelatine explosive spread to within ¼ inch of all the edges, and primed at the edge Procedure: The materials were prepared by cleaning, as described above, and then positioned and joined in the manner described above in reference to FIGURE 1.

Figure 3:
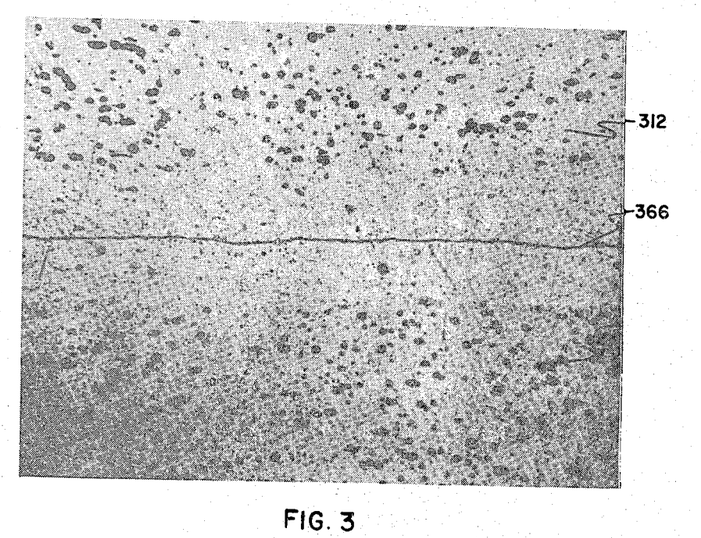
FIGURE 3 is a photomicrograph of a plurality of aluminum sheets in which an integral union has not occurred.

FIGURE 3 is a photomicrograph at 500× magnification of one clad 2024 aluminum sheet, referenced by numeral 312, and a 2024 clad aluminum sheet indicated by reference numeral 314 following joining, polishing and etching. As will be seen, a joint line or line of demarcation 366 remains at the interface. This line is indicative of a poor union and is due to voids or a lack of homogeneity within the explosive itself. This causes various areas within the material to receive an energy which is insufficient to exceed the critical energy barrier, which condition, as noted previously, must be overcome. However, FIGURE 3 is illustrative of the location of the original interfaces as represented by line of demarcation 366 with reference to the clad surfaces and orients the viewer to more fully appreciate the following photomicrograph in FIGURE 4.

Figure 4:
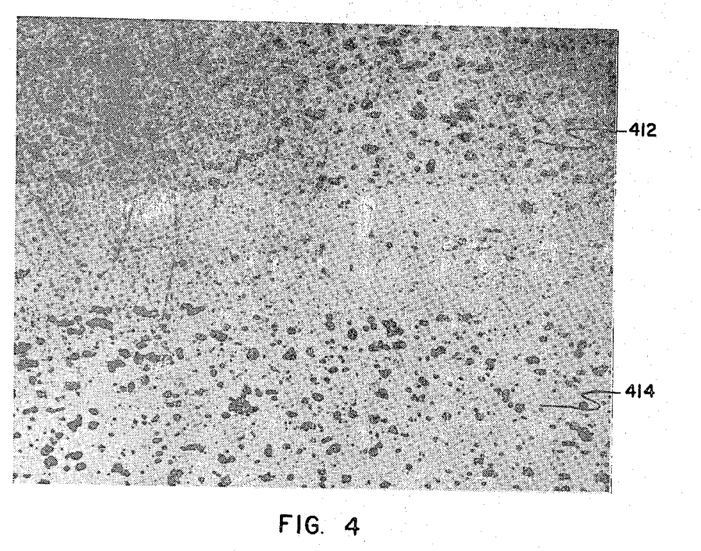
FIGURE 4 is a photomicrograph of plural aluminum sheets, similar to FIGURE 3, wherein solid state joinder has occurred in accordance with the invention.

FIGURE 4 is a photomicrograph at 500× magnification following joining, polishing and etching. This figure is similar to the photomicrograph of FIGURE 3 in that aluminum sheets, here designated as 412 and 414, are the same as those of the prior figure, but in this case, the explosive was homogeneous. This results in an energy transfer sufficient to overcome the energy barrier and thus results in solid state cohesion. It will be noted that, as in all cases employing substantially like materials and utilizing the present invention, no line of demarcation appears upon etching. It will be specifically noted, as has been consistently proven, that absolutely no melting or transverse surface waving occurs using the inventive method, but rather that substantially perfect homogeneity or integration prevails. Thus, it is apparent that the poor joint illustrated in FIGURE 3 for reference purposes, is completely rectified by employing the techniques disclosed herein, as amply illustrated in FIGURE 4.

*Example 2 (see FIGURES 5 and 6)*

Material: Two sheets of non-clad 2024–T351 aluminum placed in intimate contact, except as masked to prevent molecular bonding at one end
Cleaning: Surfaces cleaned with methyl ethyl ketone in the normal manner
Size: 6 inches x 6 inches x .040 of an inch
Explosive: A ⅜ inch layer of 65% gelatine explosive spread uniformly over the entire upper surface of the material and primed at the edge
Procedure: The materials were prepared by cleaning as described above and then positioned and joined in the manner described above in reference to FIGURE 1.

Figure 5:
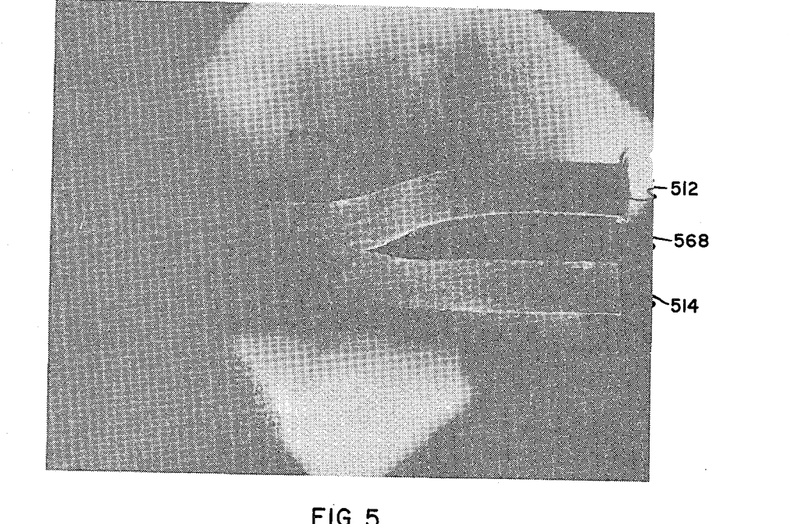
FIGURE 5 is an enlarged photograph of two processed aluminum sheets wherein one portion has been masked to prevent union.
Figure 6:
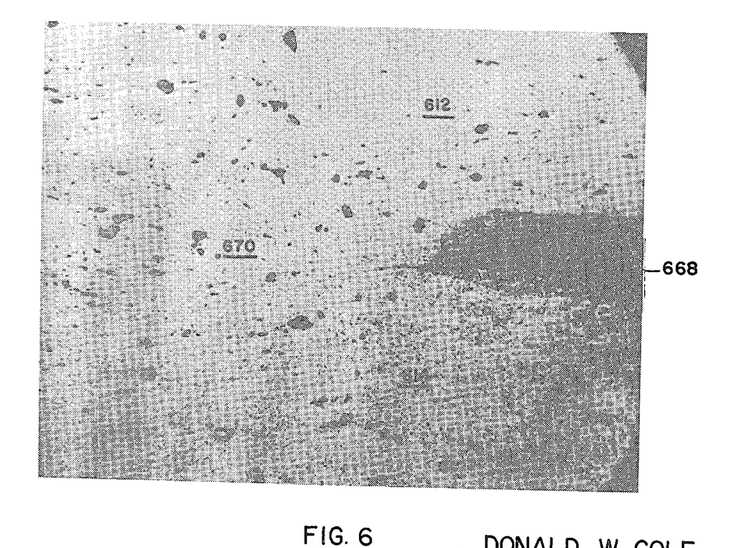
FIGURE 6 is a photomicrograph of the sheets of FIGURE 5.

FIGURE 5 is illustrative of the results attained from the above process and shows, at 15× magnification, the presence of two original sheets 512 and 514 of similar material, set forth above, at the deliberately induced void area 568, in contrast to area 570 where solid state cohesion has occurred, as illustrated in the photomicrograph in FIGURE 6 wherein the sheets corresponding to 512 and 514 are indicated by reference numerals 612 and 614; the areas 568 and 570 of FIGURE 5 corresponding to 668 and 670 of FIGURE 6. Obviously, the joint area of FIGURE 6 has been polished and etched.

Figure 7:
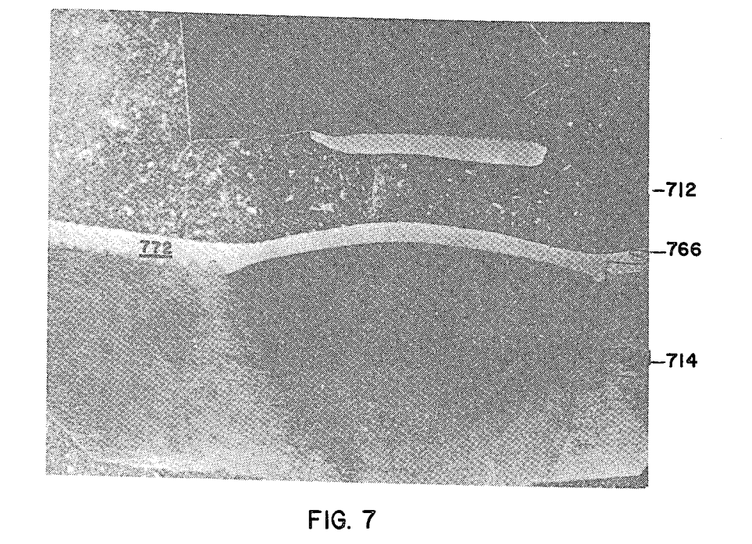
FIGURE 7 is a photomicrograph of aluminum sheets of different alloys following a poor union.

*Example 3 (see FIGURES 7 and 8)*

Material: Two juxtaposed 2219–0 aluminum plates tig-welded together and overlaid with a 2024–T6 aluminum sheet
Size: (Portion of a small oxidizer tank) 2219 aluminum ⅜ inch thick, 2024 aluminum .032 inch thick
Explosive: A ⅜ inch layer of 65% gelatine explosive, primed down center of the tig-weld with primacord (dark area in FIGURE 7)
Procedure: A protective overlay of .030 inch stainless steel was employed between the explosives and the 2024 aluminum. This procedure employed the standoff and angle of incidence technique, similar to the teaching of prior art, to provide a means for evaluation and comparison with that of the present invention. This technique results in formation of transverse interface waves 772 commonly referred to as jetting, due to the superheating and movement of entrapped gases and the resulting adiabatic conditions. These conditions cause plasticity and melting which allow relative movement of the interfaces as seen at 766 and 866 of FIGURES 7 and 8.

Figure 8:
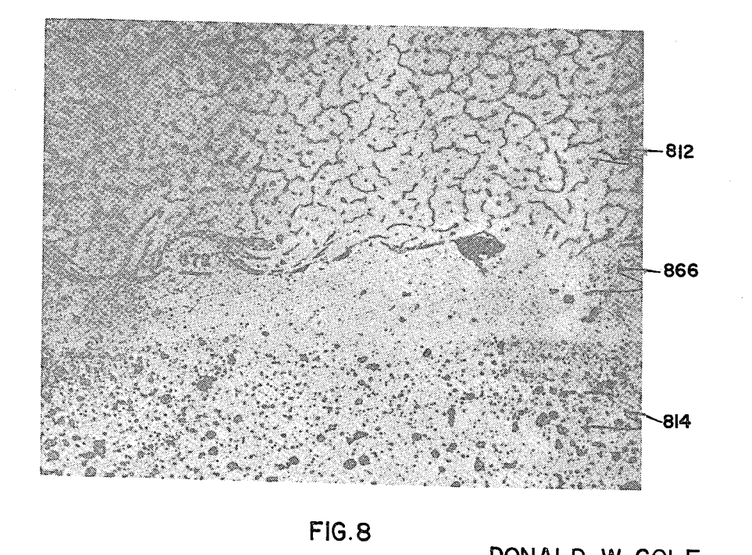
FIGURE 8 is a photomicrograph of the union shown in FIGURE 7.

FIGURE 8 reveals, at increased magnification, and following etching, transverse waves 872 (corresponding to 772 in FIGURE 7) between the weld zone 876 and the parent material 812–814. It should be noted that the efficiency of the energy input was such that complete obliteration and removal of the gases, oxides and organic impurities did not occur, for this energy was expended in moving the material mass and creating heat resulting in transverse waves 872 tending to deposit the aforementioned detrimental impurities within the weld zone.

*Example 4 (see FIGURES 9 and 10)*

Figure 9:
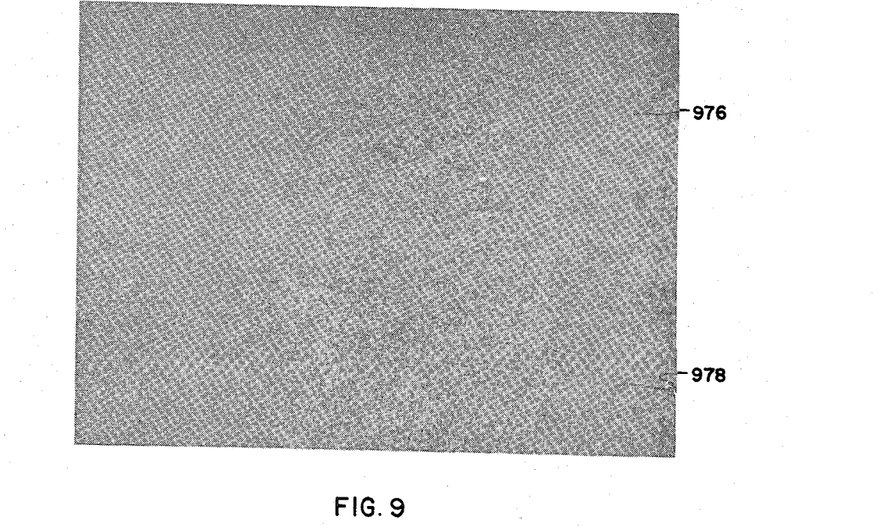
FIGURE 9 is a photomicrograph of two sheets of tantalum joined in the manner of the present invention.
Figure 10:
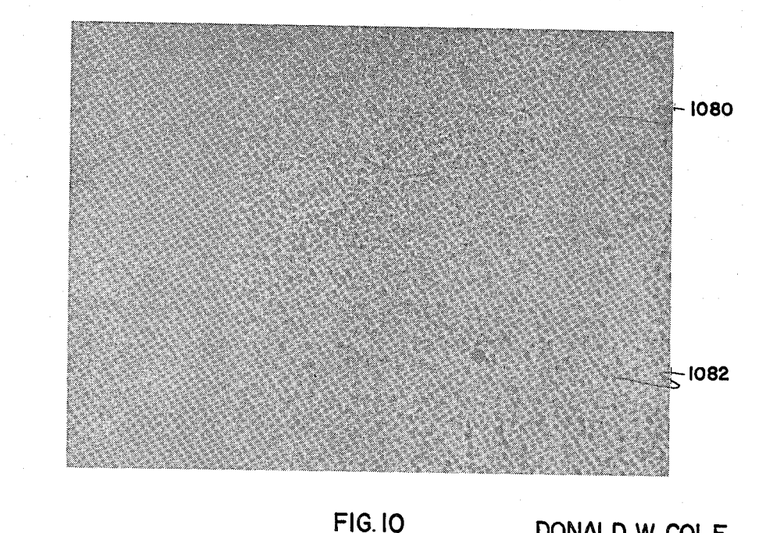
FIGURE 10 is a photomicrograph similar to FIGURE 9 but employing plural sheets of niobium.

Material: Two sheets of tantalum, as rolled and stress relieved, 976 and 978 in intimate contact (FIGURE 9); Two sheets of FS 80 niobium 1080 and 1082 in intimate contact (FIGURE 10)
Cleaning: Degreased with trichloroethylene vapors and methyl ethyl ketone in the conventional manner
Size: Tantalum 2 inches x 2 inches x .005 of an inch; niobium 2 inches x 2 inches x .005 of an inch
Explosive: 15 grams of 40% gelatine explosive primed with primacord across the center
Procedure: Same as 2 and 3 above. Solid state cohesion has occurred, as clearly illustrated in both FIGURES 9 and 10, between these materials which were heretofore very difficult to join. Even though these sheets have been polished and etched, it is obvious that they have, in each case, become one.

*Example 5 (see FIGURES 11 and 12)*

Material: One sheet 1184 of titanium 4–3–1 positioned upon and in contact with one sheet 1186 of low carbon steel, SAE 1010
Cleaning: Titanium degreased in trichloroethylene vapors and methyl ethyl ketone, low carbon steel etched in hydrochloric acid and washed in water and alcohol
Size: Titanium and low carbon steel 4 inches x 4 inches x .032 of an inch; low carbon steel 4 inches x 4 inches x .064 of an inch
Explosive: Four 4 inch x 4 inch sheets of PETN (2 grams per square inch) primed at edge
Procedure: Same as illustrated and explained in reference to FIGURE 1, resulting in solid state cohesion as shown in both FIGURES 11 and 12.

FIGURE 11 is a photomicrograph of the titanium-low carbon steel union resulting from the above procedure, the metallurgical specimen having been polished. No line of demarcation or evidence of interface is present, although, since the metals differ in structure, one (1184) reflects less light than the others and thus appears darker. Upon application of the etching solution a dark line indicated at 1288 is apparent (as shown in FIGURE 12). This dark line is resultant from the different rates of attack by the etching solution on the differing materials which produces a step effect at the boundary. This step then appears as a dark line when observed in a microscope with vertical illumination and is not indicative of a poor union. It is a result of the etching process, and should not be confused with the poor union illustrated in FIGURE 3. This condition is substantially the same as encountered at the grain boundaries in polycrystalline material and is referenced in most elementary metallography and physical metallurgy texts as exemplified by "Principles of Metallographic Laboratory Practice," Kehl, pp. 64–70 and Figure 28, page 69, and "Principles of Metallography" by Williams and Homerburg, pp. 57 and 58.

It is notable that in some cases a difference in energy utilization efficiency between unlike metals may be experienced in the form of phase transformations. Such difference was noted with titanium (for example) due to the pressure, time and temperature relationships. However, this energy utilization does not produce melting or transverse waving, and solid state cohesion does in fact occur.

In summary, therefore, the present invention is drawn to solid state metal joining and utilizes, in essence, the creation-by means of the efficient application of an energy wave from a high energy release rate source-of proper time and energy relationship wherein conditions are induced that will cause linking of the unbalanced and/or incomplete molecular or sub-molecular surface structure typical of solids, thus permitting satisfaction of the deficiency of balance of said molecular structures by their union and the consequent combination of their parts to form a whole, metallurgically identical to, or integrated with the similar structures normally existing within the body or remote from the surfaces thereof.

What is claimed is:

A method for integral solid state joining of metals without degradation of the joined region, comprising the steps of:

(A) cleaning the facing surfaces of said metals;

(B) positioning a back-up plate having substantially the same shock wave impedance as the last to be joined metal on a base member;

(C) positioning a first metal element on said back-up plate;

(D) masking portions of said facing surface of said first metal element wherein no joining is desired;

(E) positioning at least one second metal element on said first metal element with cleaned facing surfaces in intimate and direct contact throughout the area to be joined;

(F) placing means to prevent shearing of said elements at locations thereon where shock waves may collide;

(G) covering said second metal element with an homogeneous, high energy, fast explosive corresponding in configuration to the region of said first and second elements to be joined;

(H) overlaying said explosive with a filler material to insure positioning of said explosive and to efficiently direct said explosive energy into said element; and initiating an explosion in said explosive to cause a shock wave to be propagated therefrom through said metal elements.

References Cited

UNITED STATES PATENTS

| | | | |
|---|---|---|---|
| 246,407 | 8/1881 | McTighe | 29—470.1 X |
| 2,691,815 | 10/1954 | Boessenkool et al. | 29—470.1 X |
| 2,763,057 | 9/1956 | Clair | 29—497.5 X |
| 2,834,102 | 5/1958 | Pflumm et al. | 29—497.5 X |
| 3,025,592 | 3/1962 | Fischer et al. | 29—470 |
| 3,194,643 | 7/1965 | Ma et al. | 29—470.1 |
| 3,197,856 | 8/1965 | Polhemus et al. | 29—421 |
| 3,208,254 | 9/1965 | Inoue | 29—421 |

OTHER REFERENCES

Welding and Joining by Zernow, Lieberman and Kincheloe, Tool and Manufacturing Engineer, vol. 47, #1, July 1961, pages 75–78.

JOHN F. CAMPBELL, *Primary Examiner.*

P. M. COHEN, *Assistant Examiner.*